US008611820B2

(12) United States Patent
Gilmore (10) Patent No.: US 8,611,820 B2
(45) Date of Patent: Dec. 17, 2013

(54) SIGNAL SEPARATION FOR ENERGY HARVESTING

(75) Inventor: Robert P. Gilmore, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1062 days.

(21) Appl. No.: 12/564,767

(22) Filed: Sep. 22, 2009

(65) Prior Publication Data

US 2011/0070927 A1   Mar. 24, 2011

(51) Int. Cl.
*H04B 7/00* (2006.01)

(52) U.S. Cl.
USPC ............ 455/41.2; 455/323; 455/313; 455/42; 455/501; 455/67.16; 455/314; 370/206; 370/208; 375/150; 375/298; 375/346; 348/663; 348/668

(58) Field of Classification Search
USPC ............... 455/41.2, 323, 324, 313, 42, 67.16, 455/501, 314; 348/663, 664, 668, 665; 370/278
See application file for complete search history.

(56) References Cited

U.S. PATENT DOCUMENTS

| | | | | |
|---|---|---|---|---|
| 4,326,298 A | * | 4/1982 | Fromm et al. | 398/108 |
| 5,226,060 A | | 7/1993 | Goodson et al. | |
| 5,850,415 A | * | 12/1998 | Hunsinger et al. | 375/216 |
| 6,018,317 A | * | 1/2000 | Dogan et al. | 342/378 |
| 6,118,805 A | * | 9/2000 | Bergstrom et al. | 375/132 |
| 6,122,309 A | * | 9/2000 | Bergstrom et al. | 375/130 |
| 6,131,013 A | * | 10/2000 | Bergstrom et al. | 455/63.1 |
| 6,147,828 A | | 11/2000 | Bloodworth et al. | |
| 6,359,923 B1 | * | 3/2002 | Agee et al. | 375/130 |
| 6,518,929 B1 | * | 2/2003 | Gilmore | 343/725 |
| 6,574,235 B1 | * | 6/2003 | Arslan et al. | 370/464 |
| 6,654,595 B1 | * | 11/2003 | Dexter | 455/323 |
| 6,697,633 B1 | * | 2/2004 | Dogan et al. | 455/509 |
| 7,149,238 B2 | * | 12/2006 | Agee et al. | 375/141 |
| 7,231,227 B2 | * | 6/2007 | Kalhan et al. | 455/552.1 |

(Continued)

FOREIGN PATENT DOCUMENTS

| | | |
|---|---|---|
| JP | 57097738 A | 6/1982 |
| JP | 11341710 A | 12/1999 |
| WO | WO2007118911 A1 | 10/2007 |

OTHER PUBLICATIONS

Draxler, P et al., "Memory Effect Evaluation and Predistortion of Power Amplifiers", Microwave Symposium Digest, 2005 IEEE MT-S International; Jun. 12-17, 2005 p. 4 pp. 1549-1552.

(Continued)

*Primary Examiner* — Marceau Milord
(74) *Attorney, Agent, or Firm* — Ramin Mobarhan (57) ABSTRACT

Techniques for designing a communications unit including a signal separation module for energy harvesting. In an exemplary aspect, the signal separation module includes first and second quadrature hybrids coupled by band-pass filters (BPF's). Incoming signals within the pass-band of the BPF's are directed through the quadrature hybrids and through the BPF's, and emerge as a desired pass-band signal to be processed by an RX processing module. Incoming signals lying outside the pass-band of the BPF's are reflected from the BPF's back to the first quadrature hybrid, and output as a non-pass-band signal to be processed by an energy harvesting module. In a further exemplary aspect, the signal separation module resides in a detachable module coupleable to a wireless communications device, and a signal transmitted by the wireless communications device is coupled to the signal separation module for energy harvesting.

26 Claims, 11 Drawing Sheets

(56) References Cited

U.S. PATENT DOCUMENTS

| | | | |
|---|---|---|---|
| 7,265,714 B2* | 9/2007 | Goldberg | 342/378 |
| 7,299,021 B2* | 11/2007 | Pärssinen et al. | 455/226.1 |
| 7,327,777 B2* | 2/2008 | Bergstrom et al. | 375/140 |
| 7,356,075 B2* | 4/2008 | Bergstrom et al. | 375/150 |
| 7,627,052 B2* | 12/2009 | Goldberg | 375/267 |
| 7,660,534 B2* | 2/2010 | Al-Chalabi | 398/171 |
| 7,817,786 B2* | 10/2010 | Lee et al. | 379/88.23 |
| 7,869,650 B2* | 1/2011 | Park et al. | 382/167 |
| 7,916,671 B1* | 3/2011 | Zortea et al. | 370/286 |
| 7,920,637 B2* | 4/2011 | Fonseka et al. | 375/265 |
| 7,965,761 B2* | 6/2011 | Shattil | 375/147 |
| 8,326,252 B2* | 12/2012 | Li et al. | 455/302 |
| 2003/0069051 A1* | 4/2003 | Pretre et al. | 455/572 |
| 2004/0257157 A1 | 12/2004 | Sahlman | |
| 2005/0219727 A1 | 10/2005 | Kajiwara et al. | |
| 2006/0133470 A1 | 6/2006 | Raz et al. | |
| 2006/0209982 A1 | 9/2006 | De Gaudenzi et al. | |
| 2008/0304557 A1 | 12/2008 | Hollis | |
| 2009/0058521 A1 | 3/2009 | Fernandez | |
| 2009/0129257 A1 | 5/2009 | Maltsev et al. | |
| 2009/0219908 A1 | 9/2009 | Rofougaran | |
| 2009/0316826 A1 | 12/2009 | Koren et al. | |
| 2011/0069749 A1 | 3/2011 | Forrester et al. | |

OTHER PUBLICATIONS

International Search Report and Written Opinion—PCT/US2010/049884, International Search Authority—European Patent Office—Jan. 26, 2011.

Stenger, A. et al., "Nonlinear acoustic echo cancellation with 2nd order adaptive Volterra filters", Acoustics, Speech, and Signal Processing, 1999. ICASSP '99. Proceedings., 1999 IEEE International Conference on; vol. 2, Mar. 15-19, 1999 pp. 877-880 vo1.2.

Zhu et al., "Open-Loop Digital Predistortion for RF Power Amplifiers Using Dynamic Deviation Reduced-Based Volterra Series", IEEE Transactions on Microwave Theory and Techniques, vol. 56, No. 7, pp. 1524-1534, Jul. 2008.

* cited by examiner

SIGNAL SEPARATION FOR ENERGY HARVESTING

BACKGROUND

1. Field

The disclosure relates to energy harvesting, and in particular, to techniques for separating signals in energy harvesting applications.

2. Background

The proliferation of modern electrical devices makes wireless communications more challenging due to greater interference in the radio spectrum. However, such interference is also a potential energy source which may be used to supply power to the devices. Energy harvesting is the extraction of energy from the ambient environment, e.g., from radio interference, to power devices such as sensors, processors, radios and other communications devices.

In energy harvesting applications, it may be desirable to separate a desired in-band signal from out-of-band signals such as interferers, so that the in-band signal may be appropriately processed, while out-of-band signals may be harvested for their energy content. It would be desirable to provide simple and efficient techniques to perform such signal separation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well known structures and devices are shown in block diagram form in order to avoid obscuring the novelty of the exemplary aspects presented herein.

Figure 1:
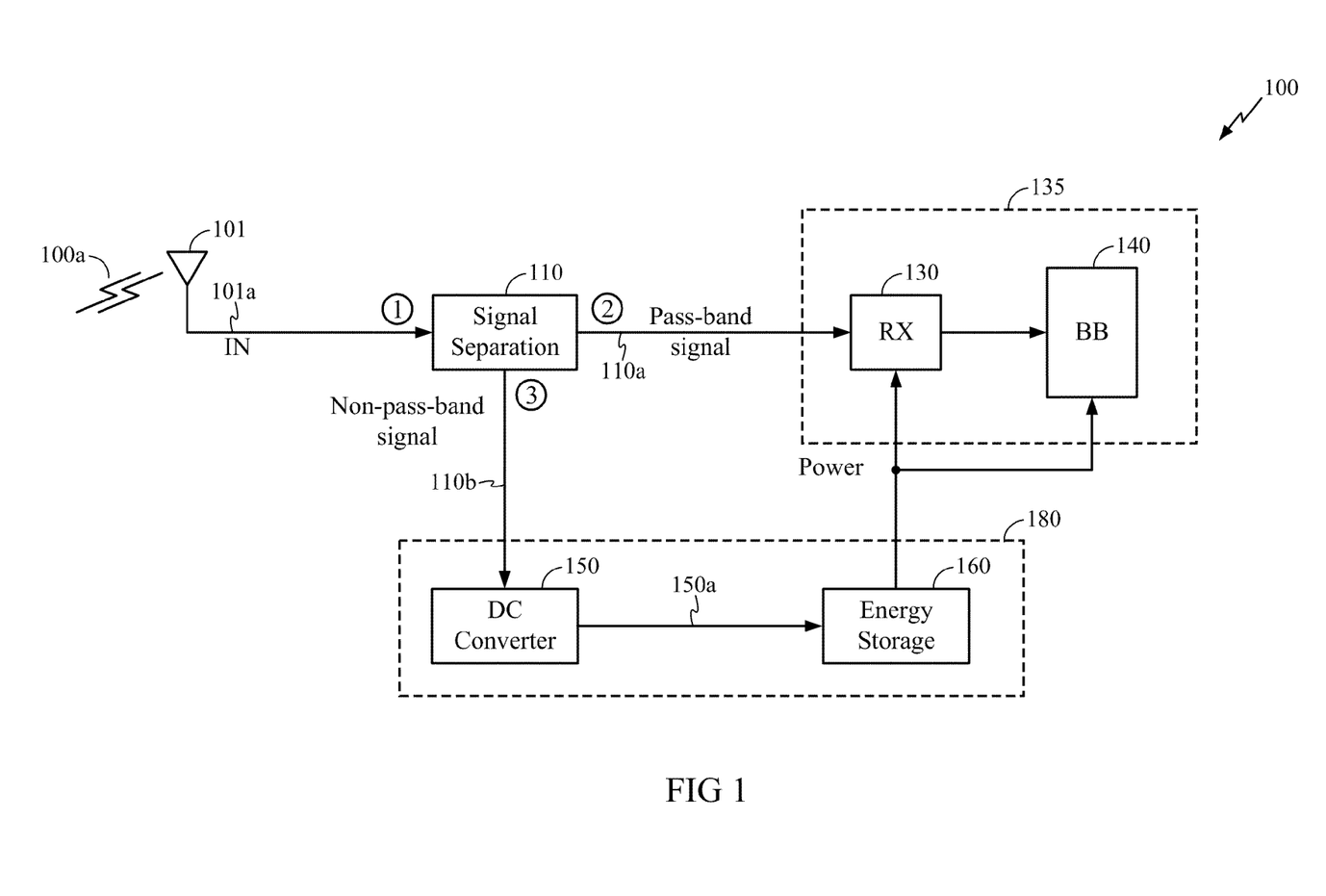
FIG. 1 illustrates an exemplary aspect of a communications unit according to the present disclosure.

FIG. 1 illustrates an exemplary aspect of a communications unit 100 according to the present disclosure. Note the communications unit 100 is provided for illustrative purposes only, and is not meant to limit the scope of the present disclosure to any particular communications unit shown. One of ordinary skill in the art will appreciate that alternative exemplary aspects may add to or omit from the blocks shown in accordance with the principles disclosed herein, and such alternative exemplary aspects are contemplated to be within the scope of the present disclosure.

In FIG. 1, a communications unit 100 includes an antenna 101 for receiving wireless signals 100a. The antenna 101 generates an input signal IN 101a coupled to a signal separation module 110. The signal separation module 110 includes at least three terminals Terminal 1, Terminal 2, and Terminal 3, wherein a designated terminal is illustrated in the accompanying figures as a circled number or letter. The signal separation module 110 separates the input signal IN 101a at Terminal 1 into a signal 110a at Terminal 2 (herein designated the "pass-band signal") to be processed by an RX processing module 130, and a signal 110b at Terminal 3 (herein designated the "non-pass-band signal") to be processed by an energy harvesting module 180. It will be appreciated that the pass-band signal 110a may correspond, e.g., to a desired signal having information content or other content to be processed by the RX processing module 130, while the non-pass-band signal 110b may correspond to out-of-band signals, e.g., jammers or interferers, present in the input signal IN 101a.

It will be appreciated that the input signal IN 101a may contain signal components having arbitrary frequency. In an exemplary aspect, the pass-band signal 110a may contain a radio-frequency (RF) signal component, and the non-pass-band signal 110b may contain RF as well as non-RF signal components. In alternative exemplary aspects, the pass-band signal 110a and/or the non-pass-band signal 110b need not contain RF signals, and may contain, e.g., microwave signals, optical signals, etc. Such alternative exemplary aspects are contemplated to be within the scope of the present disclosure.

The pass-band signal 110a is provided to an RX processing module 130. In an exemplary aspect, the RX processing module 130 may include, e.g., radio-frequency (RF) circuitry for performing operations such as filtering, amplification, frequency down-conversion, analog-to-digital conversion, etc., which operations are well-known to one of ordinary skill in the art. The RX processing module 130 is coupled to a baseband processor 140, which may perform further baseband processing in the digital domain.

In an exemplary aspect, the RX processing module 130 and baseband processor 140 may make up a processing module 135, and be co-located on a single integrated circuit (IC), e.g., a mixed-signal IC. In alternative exemplary aspects, the RX processing module 130 and baseband processor 140 may be separately provided according to techniques known to one of ordinary skill in the art, and such alternative exemplary aspects are contemplated to be within the scope of the present disclosure.

In the exemplary aspect shown, the energy harvesting module 180 includes a DC converter 150 coupled to an energy storage device 160. The DC converter 150 converts the non-pass-band signal 110b into, e.g., a DC signal 150a. Techniques for conversion of a signal, e.g., an RF signal, to a DC signal include, e.g., rectification and signal conditioning techniques that are well-known in the art, and will not be further described herein.

Note the signal 110b may generally include out-of-band signals, e.g., jammer components from interference sources such as other communications devices (not shown), broadcast television and/or radio transmitters, etc. In an exemplary aspect, the signal 110b may also include signals intentionally sent by a transmitter for the purpose of energy harvesting by the receiver. For example, such signals intentionally sent by a transmitter may include one or more carriers having frequency outside the pass-band of the signal separation module 110. In such an exemplary aspect, it will be appreciated that the signal separation module 110 further advantageously removes such non-pass-band signals from the input signal IN 101a prior to providing to the RX processing module 130, thereby preventing inter-modulation products from being created due to non-linearities in the components of the RX processing module 130.

In an exemplary aspect, the DC signal 150a may be coupled to an energy storage device 160 as shown. For example, the energy storage device 160 may include a storage capacitor (not shown), and the signal 150a may be a DC voltage level that charges the storage capacitor. The energy storage device 160 may further be coupled to the RX processing module 130 and/or the baseband processor 140 to supply power to those modules. In alternative exemplary aspects, the energy storage device 160 may further supply power to other modules (not shown) in the communications unit 100, and such alternative exemplary aspects are contemplated to be within the scope of the present disclosure.

Figure 2:
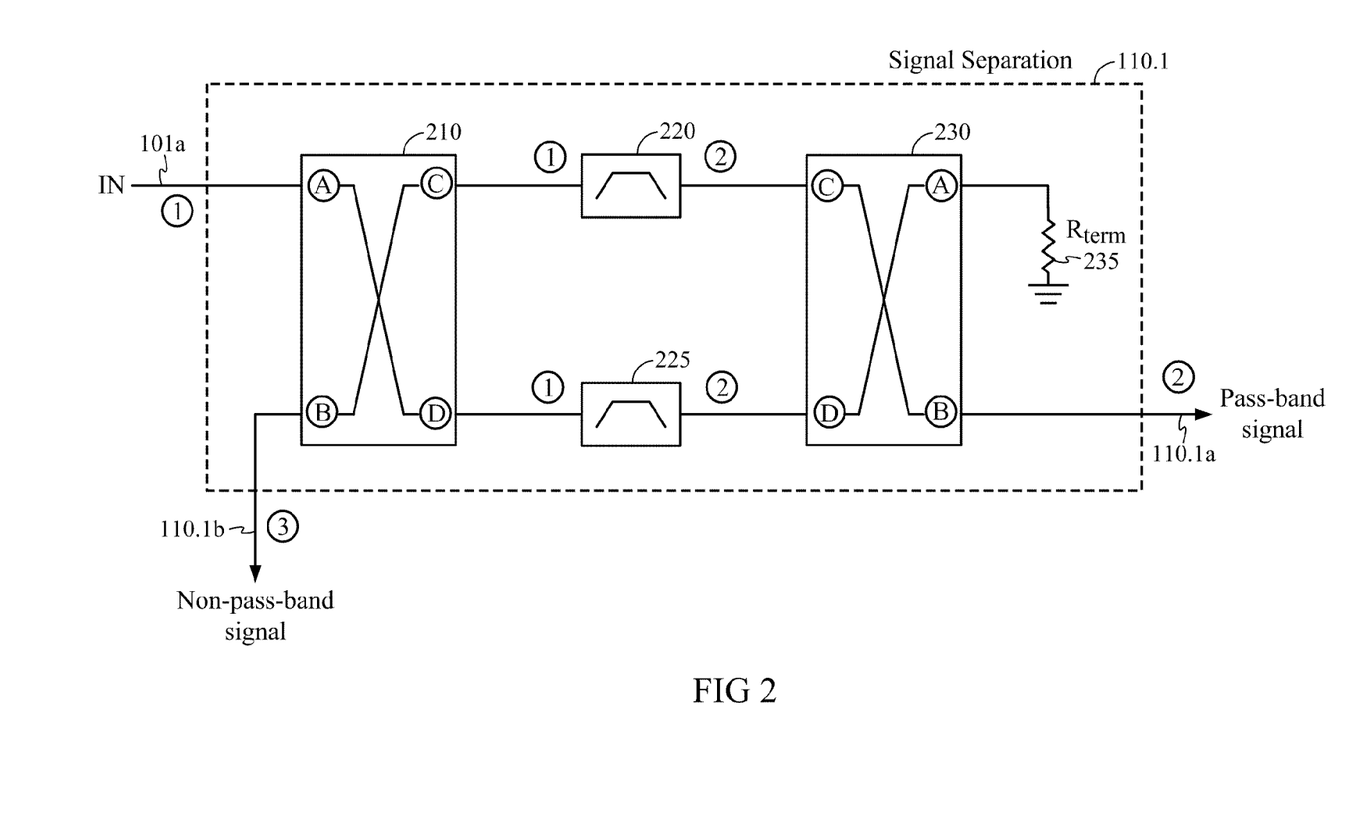
FIG. 2 illustrates an exemplary aspect of a signal separation module according to the present disclosure.

FIG. 2 illustrates an exemplary aspect 110.1 of a signal separation module 110 according to the present disclosure.

In FIG. 2, the signal separation module 110.1 includes first and second quadrature hybrids 210 and 230. One of ordinary skill in the art will appreciate that a quadrature hybrid contains four terminals A, B, C, D. A quadrature hybrid ideally splits an incoming voltage wave at terminal A into two equal-amplitude, quadrature-phase outgoing voltage waves at terminals C and D. Furthermore, incoming quadrature-phase voltage waves at terminals C and D are designed to be combined in-phase as an outgoing voltage wave at terminal B.

One of ordinary skill in the art will appreciate that the terminals A and B of a quadrature hybrid may generally be inter-changed with terminals C and D, and thus alternative exemplary aspects of the present disclosure may employ quadrature hybrids in such configurations other than those explicitly shown in the accompanying figures and description. Such alternative exemplary aspects are contemplated to be within the scope of the present disclosure.

Coupling the first quadrature hybrid 210 to the second quadrature hybrid 230 are first and second bandpass filters (BFP's) 220 and 225. In an exemplary aspect, the frequency response of the first BPF 220 is matched to the frequency response of the second BPF 225. Further provided in the signal separation module 110.1 is a non-reflective load 235 having resistance $R_{term}$, e.g., 50 Ohms, at terminal A of the second quadrature hybrid 230.

In an exemplary aspect, the impedance presented to terminal A of the first quadrature hybrid 210 may also be matched to that of the system, such that reflections are minimized over a suitably broad bandwidth.

One of ordinary skill in the art will appreciate that a BPF is ideally designed to pass signals having frequencies within its "pass-band" unattenuated from a first terminal (e.g., terminal 1) to a second terminal (e.g., terminal 2), while rejecting signals having frequencies outside its pass-band.

Figure 2A:
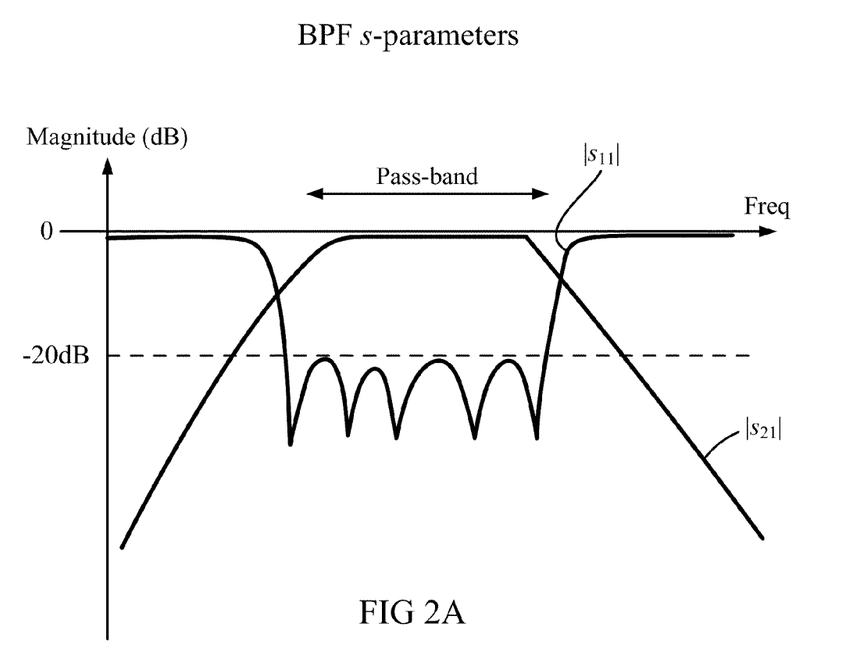
FIG. 2A illustrates exemplary s-parameter characteristics of a band-pass filter (BPF).

FIG. 2A illustrates exemplary s-parameter characteristics of a BPF. In FIG. 2A, the BPF is seen to have a reflection coefficient ($|s_{11}|$) of magnitude near 1 (or 0 dB) outside its pass-band, and a reflection coefficient of small magnitude (e.g., less than −20 dB) in its pass-band. Furthermore, the BPF has a gain ($|s_{21}|$) of magnitude near 1 in its pass-band, and a gain of small magnitude (e.g., less than −20 dB) outside its pass-band.

One of ordinary skill in the art will appreciate that the exemplary BPF s-parameter characteristics in FIG. 2A are shown for illustrative purposes only, and are not intended to limit the scope of the present disclosure to BPF's having any particular characteristics shown. Alternative exemplary aspects may have different characteristics than those shown, e.g., multiple pass-bands, different relationships between $|s_{11}|$ and ($|s_{21}|$), etc. Such alternative exemplary aspects are contemplated to be within the scope of the present disclosure.

In the exemplary aspect 110.1 of the signal separation module 110 shown in FIG. 2, the BPF's 220 and 225 are designed to have pass-bands covering the range of frequencies expected to be processed by the RX processing module 130. In this manner, the signal separation module 110.1 may advantageously separate the incoming signal IN 101a from the antenna 101 into a pass-band signal 110a at terminal D of the second quadrature hybrid 230, and a non-pass-band signal 110b at terminal B of the first quadrature hybrid 210, according to the principles further described hereinbelow.

Figure 3A:
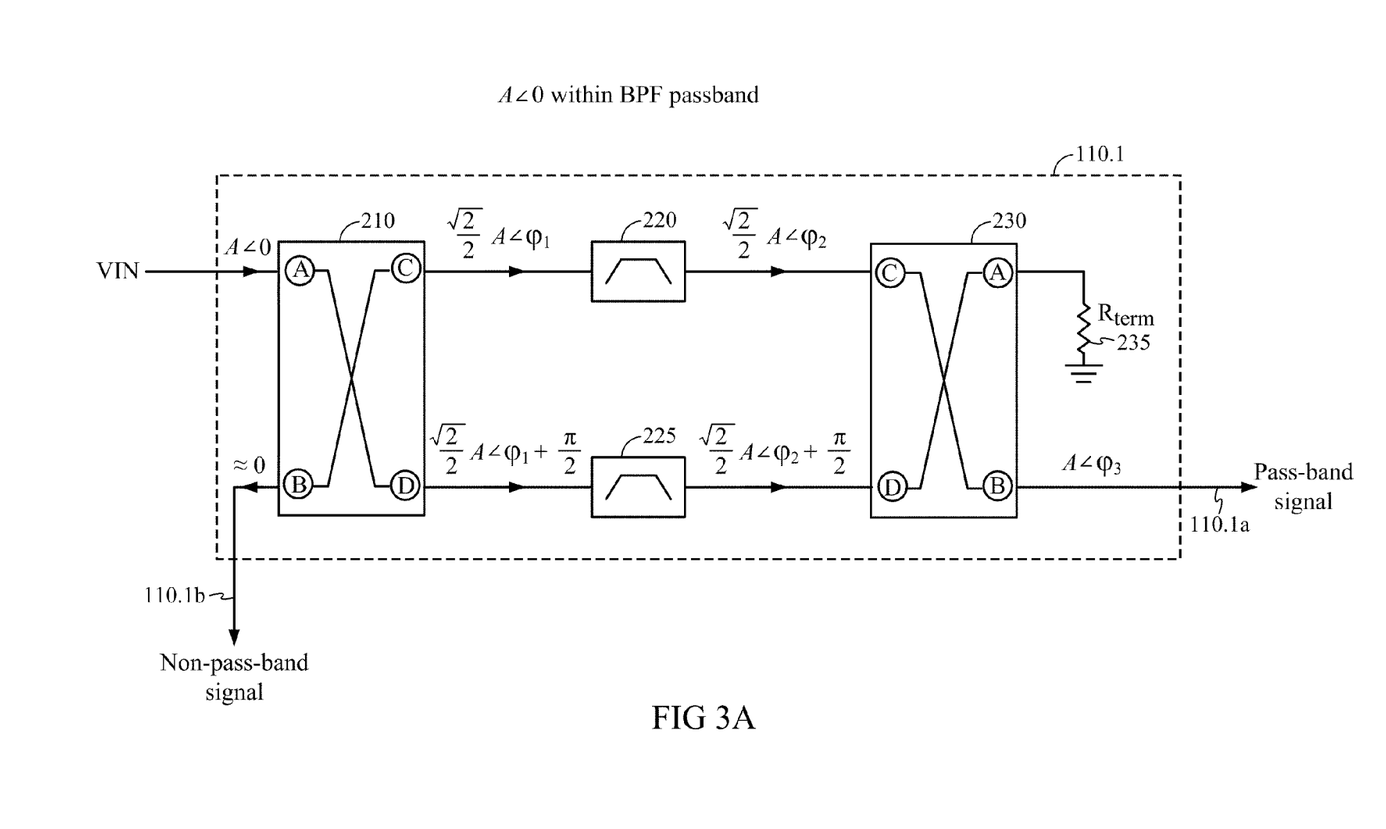
FIG. 3A illustrates exemplary processing performed by the signal separation module on an input voltage VIN having a frequency that lies within the pass-band of the BPF's.

FIG. 3A illustrates exemplary processing performed by the signal separation module 110.1 on an input voltage VIN having a frequency that lies within the pass-band of the BPF's 220 and 225. In FIG. 3A, VIN is expressed as a phasor A∠0, wherein A represents the amplitude, and ∠ represents the phase of the voltage wave (in radians). The first quadrature hybrid 210 splits the incoming voltage wave A∠0 at terminal A into outgoing voltage waves $$\frac{\sqrt{2}}{2} A \ \angle \varphi_1 \text{ and } \frac{\sqrt{2}}{2} A \ \angle \varphi_1 + \frac{\pi}{2}$$

at terminals C and D, respectively. BPF's 220 and 225 allow the voltage waves to pass through as $$\frac{\sqrt{2}}{2} A \ \angle \varphi_2 \ \text{and} \ \frac{\sqrt{2}}{2} A \ \angle \varphi_2 + \frac{\pi}{2}$$

to terminals C and D, respectively, of the second quadrature hybrid 230.

The second quadrature hybrid 230 re-combines the incoming quadrature voltage waves $$\frac{\sqrt{2}}{2} A \ \angle \varphi_2 \ \text{and} \ \frac{\sqrt{2}}{2} A \ \angle \varphi_2 + \frac{\pi}{2}$$

at terminals C and D, respectively, into an outgoing voltage wave $A \angle \phi_3$ at terminal B. The outgoing voltage wave at terminal B of the second quadrature hybrid 230 is supplied as the output pass-band signal 110.1a of the signal separation module 110.1. It is seen that that the amplitude A of VIN is substantially unattenuated at terminal B of the second quadrature hybrid 230.

Figure 3B:
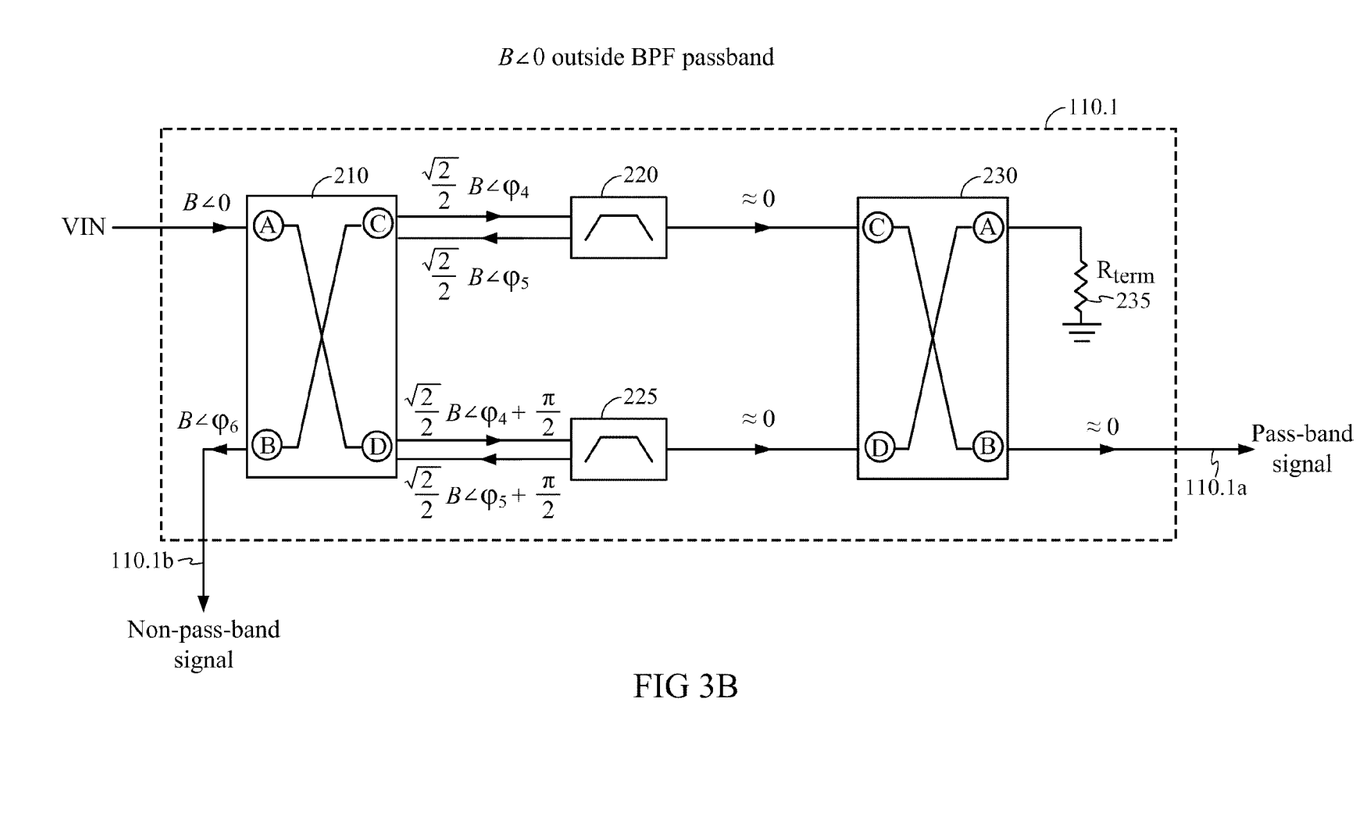
FIG. 3B illustrates exemplary processing performed by the signal separation module on an input voltage VIN having a frequency that lies outside the pass-band of the BPF's.

FIG. 3B illustrates exemplary processing performed by the signal separation module 110.1 on an input voltage VIN having a frequency that lies outside the pass-band of the BPF's 220 and 225. In FIG. 3B, VIN is expressed as a voltage phasor B∠0. The first quadrature hybrid 210 splits the incoming voltage wave B∠0 at its terminal A into outgoing voltage waves $$\frac{\sqrt{2}}{2} B \ \angle \varphi_4 \ \text{and} \ \frac{\sqrt{2}}{2} B \ \angle \varphi_4 + \frac{\pi}{2}$$

at terminals C and D, respectively. As B∠0 is assumed to be outside the pass-band of the BPF's, BPF's 220 and 225 reflect the incoming voltage waves $$\frac{\sqrt{2}}{2} B \ \angle \varphi_4 \ \text{and} \ \frac{\sqrt{2}}{2} B \ \angle \varphi_4 + \frac{\pi}{2}$$

as outgoing voltage waves $$\frac{\sqrt{2}}{2} B \ \angle \varphi_5 \ \text{and} \ \frac{\sqrt{2}}{2} B \ \angle \varphi_5 + \frac{\pi}{2},$$

respectively. Furthermore, the BPF's 220 and 225 substantially attenuate the incoming voltage waves $$\frac{\sqrt{2}}{2} B \ \angle \varphi_4 \ \text{and} \ \frac{\sqrt{2}}{2} B \ \angle \varphi_4 + \frac{\pi}{2}$$

(e.g., to a level that is approximately zero, as shown in FIG. 3B) at the BPF output terminals. The reflected quadrature voltage waves $$\frac{\sqrt{2}}{2} B \ \angle \varphi_5 \ \text{and} \ \frac{\sqrt{2}}{2} B \ \angle \varphi_5 + \frac{\pi}{2}$$

are re-combined by the first quadrature hybrid 210 into the outgoing voltage wave $B \angle \phi_6$ at terminal B. The outgoing voltage wave at terminal B of the first quadrature hybrid 220 is supplied as the output non-pass-band signal 110.1b of the signal separation module 110.1. It is seen that the amplitude B of VIN is substantially unattenuated at terminal B of the first quadrature hybrid 210, while the amplitude at terminal B of the second quadrature hybrid 230 due to VIN is approximately zero.

In light of the preceding description, it will be appreciated that the signal separation module 110.1 advantageously separates the input signal IN into a pass-band signal 110.1a having a frequency within the pass-band of the BPF's 220, 225 and a non-pass-band signal 110.1b that falls outside the BPF pass-band. In this manner, the non-pass-band signal 110.1b may be supplied to an energy harvesting module, e.g., energy harvesting module 180 in FIG. 1, while the pass-band signal 110.1a may be passed on undisturbed to an RX processing module, e.g., RX processing module 130 in FIG. 1.

Figure 4:
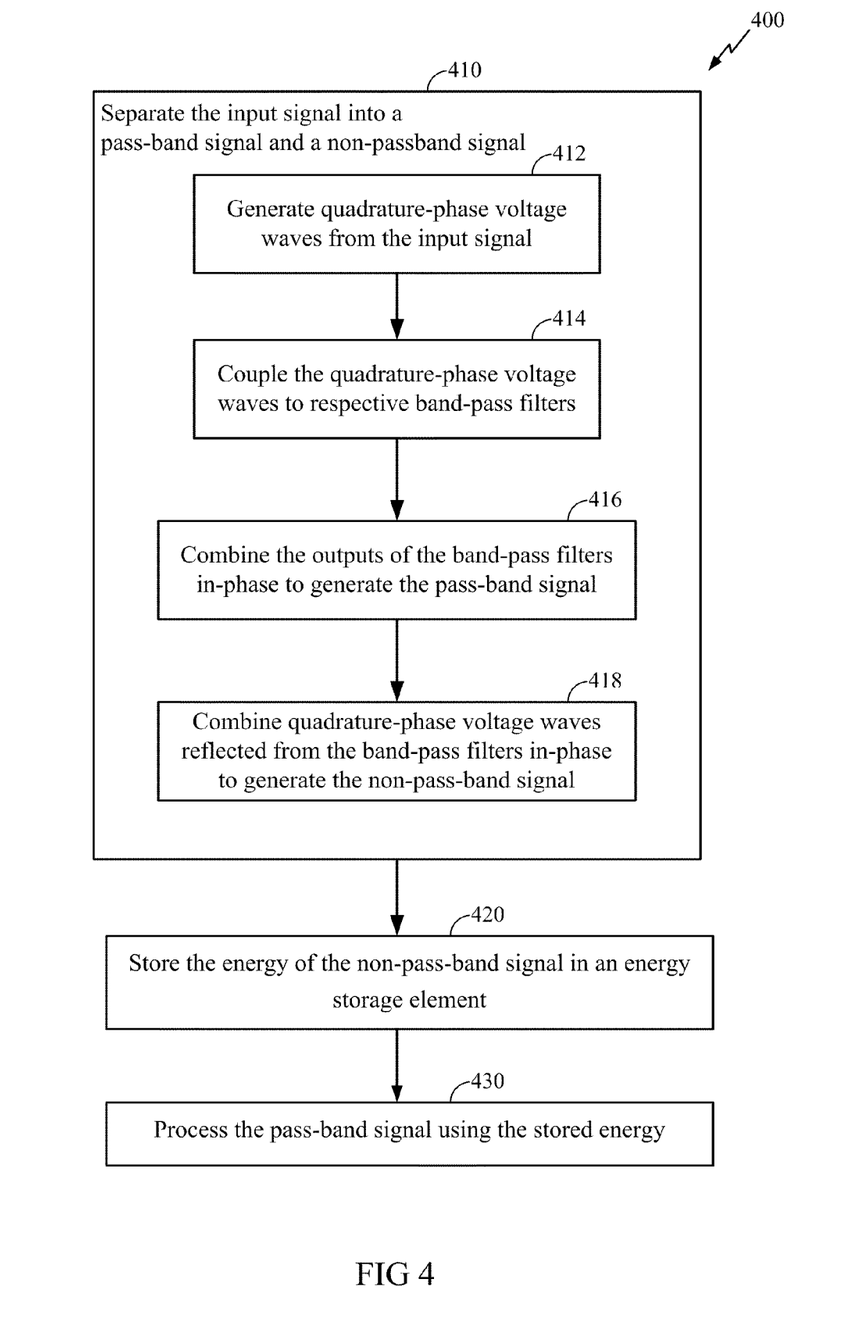
FIG. 4 illustrates an exemplary aspect of a method according to the present disclosure.

FIG. 4 illustrates an exemplary aspect of a method 400 according to the present disclosure. The method 400 is for harvesting energy from an input signal.

In FIG. 4, at block 410, an input signal is separated into a pass-band signal and a non-pass-band signal. In an exemplary aspect, the separating at block 410 includes the following blocks.

At block 412, quadrature-phase voltage waves are generated from the input signal.

At block 414, the quadrature-phase voltage waves are coupled to respective band-pass filters.

At block 416, the outputs of the band-pass filters are combined in-phase to generate the pass-band signal.

At block 418, the quadrature-phase voltage waves reflected from the band-pass filters are combined in-phase to generate the non-pass-band signal.

At block 420, the energy of the non-pass-band signal is stored in an energy storage element.

At block 430, the pass-band signal is processed using the stored energy.

Figure 5:
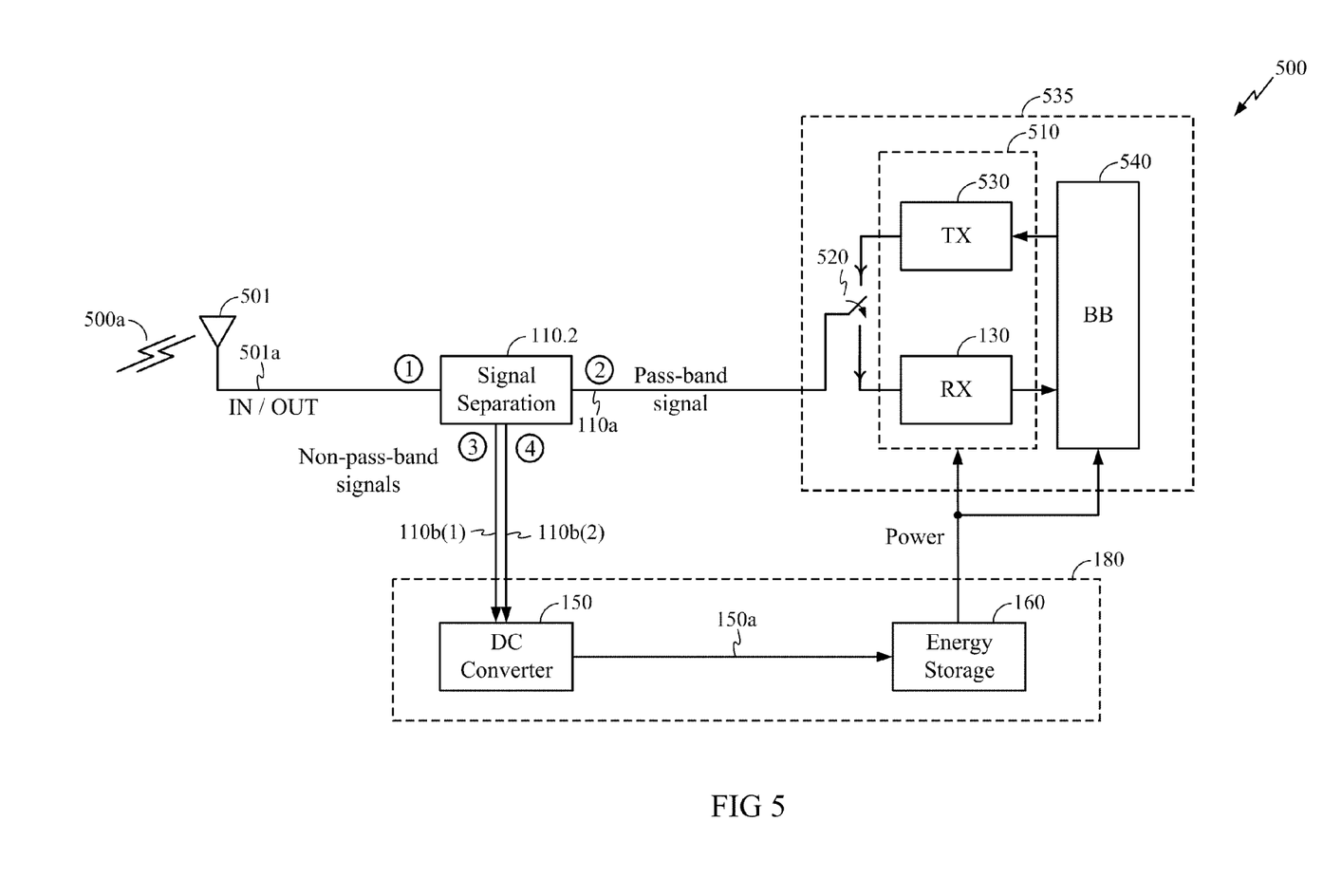
FIG. 5 illustrates an alternative exemplary aspect of a communications unit employing both a transmitter and a receiver according to the present disclosure.

FIG. 5 illustrates an alternative exemplary aspect of a communications unit 500 employing both a transmitter and a receiver according to the present disclosure.

In FIG. 5, the communications unit 500 includes both a transmit (TX) processing module 530 and an RX processing module 130. The output of the TX processing module 530 and the input to the RX processing module 130 are selectively coupled by a switch 520 to Terminal 2 of a signal separation module 110.2.

In an exemplary aspect, the communications unit 500 may communicate wirelessly over an antenna 501 according to a protocol wherein transmission of a (TX) signal generated by the TX processing module 530 is time-division duplexed with reception of a (RX) signal by the RX processing module 130, and both the TX and RX signals lie within the pass-band of the signal separation module 110.2.

One of ordinary skill in the art will appreciate that the techniques of the present disclosure may readily accommodate transmission and reception according to protocols other than time-division duplex (TDD) protocols, e.g., as long as the frequency ranges of the transmitted and received signals both lie within the pass-band of the signal separation module 110.2. For example, transmitting and receiving signals using a frequency division duplex (FDD) protocol may readily be accommodated, e.g., by replacing the switch 520 with a duplexer or diplexer (not shown). Such alternative exemplary aspects are contemplated to be within the scope of the present disclosure.

In the exemplary aspect shown, the antenna 501 may be designed for both transmitting and receiving wireless signals 500*a*. For example, a signal 501*a* at a connector of the antenna 501 may be coupled to terminal 1 of the signal separation module 110.2. Furthermore, the RX processing module 130 and the TX processing module 530 may be jointly provided on a single radio-frequency integrated circuit (RFIC) 510 as shown, and jointly powered by energy from the energy harvesting module 180. The RFIC 510 may be further integrated with a baseband processor 540 to form a processing module 535 located on a single mixed-signal IC, with the baseband processor 540 providing baseband functionality to both the TX processing module 530 and the RX processing module 130. In alternative exemplary aspects (not shown), the RX processing module 130, the TX processing module 530, and the baseband processor 540 need not be integrated on a single IC, and modifications to the techniques shown to accommodate such alternative exemplary aspects may be readily derived by one of ordinary skill in the art in light of the present disclosure. Such alternative exemplary aspects are contemplated to be within the scope of the present disclosure.

In an exemplary aspect, separation of an RX signal at terminal 1 of the signal separation module 110.2 into a pass-band signal 110*a* at terminal 2 and a non-pass-band signal 110.2*b*(1) at terminal 3 may proceed as earlier described with reference to the signal separation module 110.1 of FIG. 2. Concurrently or alternatively, separation of a TX signal from the TX processing module 530 at terminal 2 into a pass-band signal at terminal 1 and a non-pass-band signal 110.2*b*(2) at terminal 4 of the signal separation module 110.2 may proceed as described hereinbelow with reference to FIG. 6.

Figure 6:
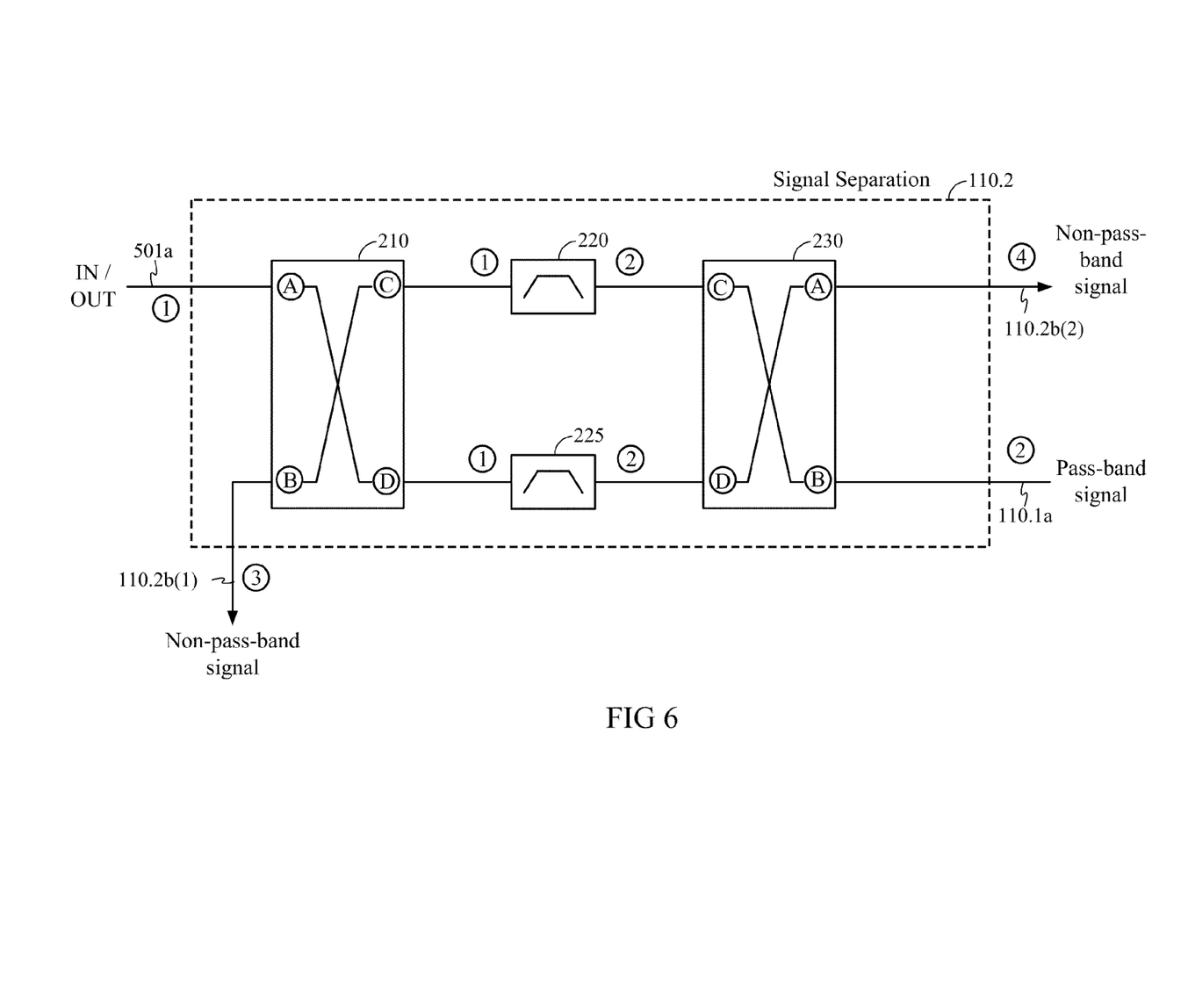
FIG. 6 illustrates an exemplary aspect of a signal separation module for separating both an incoming TX signal and an incoming RX signal into pass-band and non-pass-band signals.

FIG. 6 illustrates an exemplary aspect of a signal separation module 110.2 for separating both an incoming TX signal and an incoming RX signal into pass-band and non-pass-band signals. Note similarly labeled blocks in FIGS. 2 and 6 may have similar functionality, unless otherwise noted.

In FIG. 6, terminal B of the second quadrature hybrid 230 is coupled to terminal 2 of the signal separation module 110.2. In an exemplary aspect, the separation of the RX signal in 501*a* into a pass-band signal at terminal 2 and a non-pass-band signal 110.2*b*(1) at terminal 3 may proceed as earlier described, e.g., with reference to FIG. 2. In an exemplary aspect, due to symmetry of the signal separation module 110.2, an incoming TX signal at terminal B of the second quadrature hybrid 230 is also separated into a pass-band signal at terminal 1 and a non-pass-band signal 110.2*b*(2) at terminal 4. The non-pass-band signal 110.2*b*(2) associated with the TX signal may also be provided to the energy harvesting module 180, as shown in FIG. 5. It will be appreciated that in this manner, out-of-band components of the TX signal may advantageously be sent to the energy harvesting module 180, rather than over the air via antenna 501, where it may undesirably cause interference in the radio spectrum.

In an exemplary aspect, the impedance presented by the energy harvesting module 180 to the terminals of the signal separation module 110.2 may be matched to that of the system, such that reflections are minimized over a suitably broad bandwidth.

In alternative exemplary aspects, energy harvesting from the TX signal need not be performed together with energy harvesting from the RX signal, and a system may be designed to harvest energy only from the TX signal or from the RX signal. Such alternative exemplary aspects are contemplated to be within the scope of the present disclosure.

Figure 7:
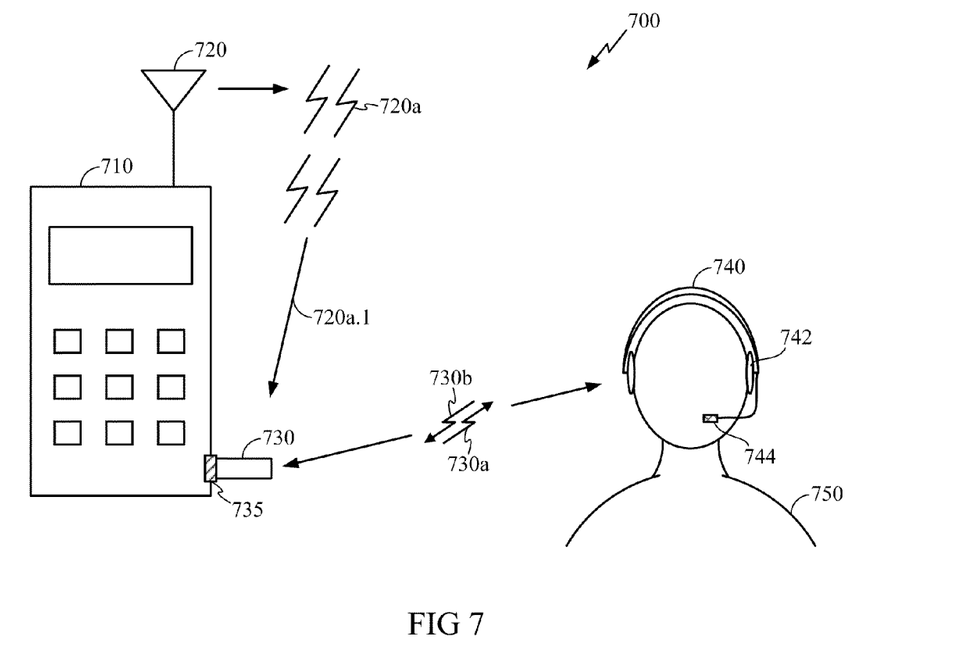
FIG. 7 illustrates an exemplary aspect of the techniques herein as applied to a personal communications system according to the present disclosure.

FIG. 7 illustrates an exemplary aspect of the techniques herein as applied to a personal communications system 700 according to the present disclosure. Note the system 700 is shown for illustrative purposes only, and is not meant to limit the scope of the present disclosure.

The personal communications system 700 includes a mobile phone 710 with an antenna 720 for wirelessly communicating with a network, e.g., a base station (not shown) of a network. The mobile phone 710 may transmit wireless signals 720*a* to communicate with such a network, and may further receive wireless signals (not shown) from the network. It will be understood that there are a plurality of standards/protocols specifying the format of wireless communications between a mobile phone 710 and a network, such as CDMA, W-CDMA, GSM, LTE, etc. One of ordinary skill in the art will appreciate that the techniques of the present disclosure may be readily applied to any such standards or protocols.

The mobile phone 710 is further shown coupled to a detachable module 730 a port 735. In the exemplary aspect shown in FIG. 7, the port 735 is an audio port 735, and the detachable module 730 is a wireless headset dongle that connects with the audio port 735, e.g., via a TRS audio connector. In alternative exemplary aspects (not shown), the port may support any means for connecting devices and exchanging signals known in the art, e.g., an audio/video connector, or other type of connector.

In an exemplary aspect, the wireless headset dongle 730 is configured to receive an audio signal from the audio port 735. The audio signal may be, e.g., the result of processing a wireless signal received at the mobile phone 710 from the network (not shown) over the antenna 720, and may contain, e.g., voice, music, or other content. The wireless headset dongle 730 communicates the audio signal from the audio port 735 over the air via a wireless signal 730*a* to a wireless headphone/microphone apparatus 740 that includes headphones 742 and a microphone 744 worn by a user 750.

It will be understood that there are a plurality of standards/protocols, open or proprietary, specifying the format of wireless communications between two devices such as the wireless headset dongle 730 and the wireless headphone/microphone apparatus 740, e.g., the Bluetooth specification known in the art. One of ordinary skill in the art will appreciate that the techniques of the present disclosure may be readily applied to any such standards or protocols.

In an exemplary aspect, the wireless headset dongle 730 may also receive a wireless signal 730*b* from the wireless headphone/microphone apparatus 740. The wireless signal 730*b* may include information on an audio signal picked up by the microphone 744, e.g., from the voice of the user 750. The wireless signal 730*b* may be processed by the wireless headset dongle 730, and provided back to the mobile phone 710 via the audio port 735, which may support bidirectional audio signals in the exemplary aspect. In an exemplary aspect, the mobile phone 710 may further process and transmit the audio signal from the user 750 over the antenna 720 to the network.

Figure 7A:
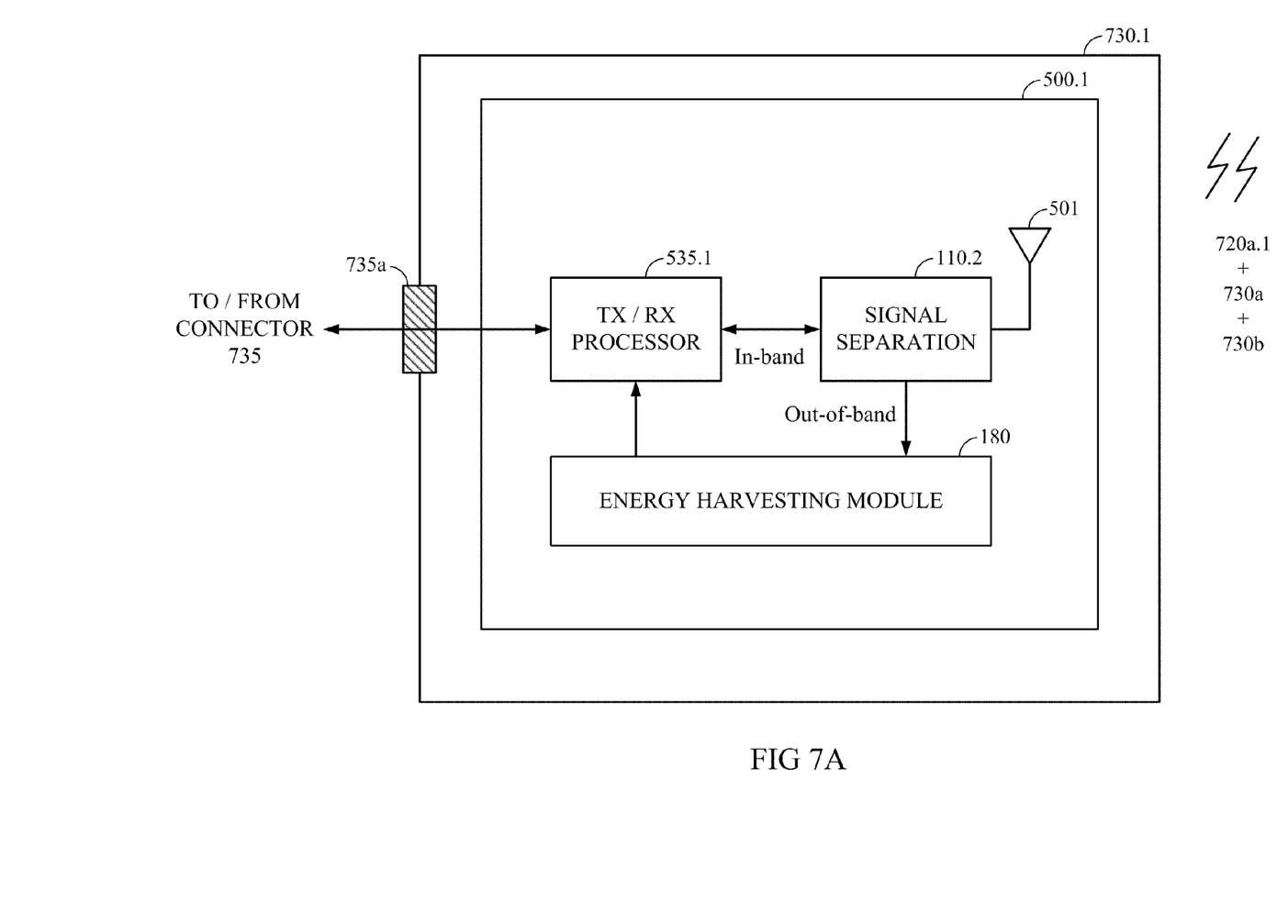
FIG. 7A illustrates an exemplary aspect of a detachable module according to the present disclosure.

In an exemplary aspect, the detachable module 730 may be powered by harvesting energy from a portion 720*a*.1 of the wireless signal 720*a* transmitted by the mobile phone 710 intended for the network. In an exemplary aspect, the detachable module 730 may include an instance of the communications unit 100 or 500 as earlier described with reference to FIG. 1 or FIG. 5, respectively. FIG. 7A illustrates an exemplary aspect 730.1 of a detachable module 730 that performs energy harvesting according to the present disclosure.

In FIG. 7A, the detachable module 730.1 includes an instance 500.1 of a communications module 500 according to the present disclosure. As earlier described herein with reference to FIG. 5, the communications module 500.1 includes an antenna 501, a signal separation module 110.2, an energy harvesting module 180, and a TX/RX processor 535.1 that may be implemented as a mixed-signal IC. In the exemplary aspect shown, the TX/RX processor 535.1 may send and receive an audio signal to and from the audio port 735 of the mobile phone 710 via a connector 735a.

In an exemplary aspect, the antenna 501 may wirelessly transmit and receive signals 730a and 730b from the wireless headset/microphone apparatus 740. Furthermore, the antenna 501 may receive a portion 720a.1 of the wireless signal transmitted by the mobile phone 710 to a network. In an exemplary aspect, the signal separation module 110.2 may be configured to process the signals 730a and 730b as the in-band signal, and the signal 720a.1 as the out-of-band signal. In this manner, the signals 730a and 730b may be coupled between the signal separation module 110.2 and the TX/RX processor 535.1, while the signal 720a.1 may be provided to the energy harvesting module 180. The configuration of the signal separation module to separate the out-of-band signal 720a.1 from the in-band signals 730a and 730b will be clear to one of ordinary skill in the art in light of the present disclosure. In an exemplary aspect, the signals 730a, 730b may occupy a different frequency range from that occupied by the signal 720a to facilitate separation by the signal separation module 110.1.

In an alternative exemplary aspect, the detachable module 730 may be powered by harvesting energy from a wireless charging signal (not shown) transmitted by the mobile phone 710 explicitly intended for charging the detachable module 730. For example, such a wireless charging signal need not be a CDMA signal, and may simply include one or more carriers having frequency outside the pass-band of the BPF's in the signal separation module 110.2 of the detachable module 730.1. In an exemplary aspect, the wireless charging signal may lie in an unregulated frequency band such as the ISM band known to one of ordinary skill in the art. Such alternative exemplary aspects are contemplated to be within the scope of the present disclosure.

Note various alternative exemplary aspects will be clear to one of ordinary skill in the art in light of the exemplary aspect 700 shown in FIG. 7. For example, the detachable module 730 need not be a wireless headset dongle, and may be any device supporting reception and/or transmission of wireless signals. In an exemplary aspect, the detachable module 730 may be coupled to any port, e.g., a non-audio port, on the mobile phone 710, including ports supplying no DC power to the detachable module 730, in which case the detachable module 730 may derive all its power using the energy harvesting techniques described herein. The detachable module 730 may also be connected to a port supplying some DC power, in which case the detachable module 730 may still derive some portion of its power using the energy harvesting techniques described herein. Furthermore, the mobile phone 710 may be replaced by any wireless communications device, e.g., a personal digital assistant (PDA), laptop computer, etc. Such alternative exemplary aspects are contemplated to be within the scope of the present disclosure.

Figure 8:
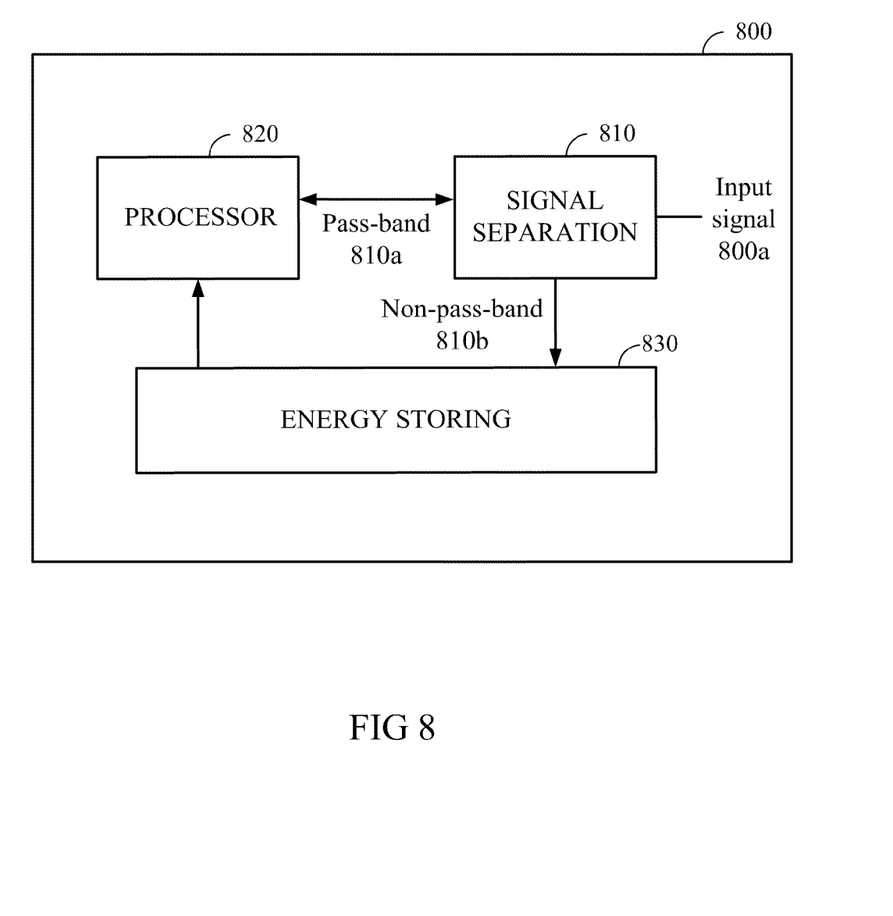
FIG. 8 illustrates an exemplary apparatus according to the present disclosure.

FIG. 8 illustrates an exemplary apparatus 800 according to the present disclosure. The apparatus 800 is for harvesting energy from an input signal 800a. The apparatus 800 comprises means 810 for separating the input signal 800a into a pass-band signal 810a and a non-pass-band signal 810b. The apparatus 800 further comprises a means 830 for storing the energy of the non-pass-band signal 810b, and a means 820 for processing the pass-band signal 810a using power supplied by the means for storing 830.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus for harvesting energy from an input signal, the apparatus comprising:
   a signal separation module configured to receive the input signal and generate quadrature-phase voltage waves to separate the input signal into a pass-band signal and a non-pass-band signal;
   an energy harvesting module configured to store the energy of the non-pass-band signal; and
   a processing module configured to process the pass-band signal using power supplied by the energy harvesting module.

2. The apparatus of claim 1, the signal separation module comprising:
   first and second quadrature hybrids each having four terminals A, B, C, D, each quadrature hybrid configured to separate an incoming voltage wave at terminal A into the quadrature-phase voltage waves at terminals C and D, each quadrature hybrid further configured to combine incoming quadrature-phase voltage waves at terminals C and D into an outgoing voltage wave at terminal B, terminal A of the first quadrature hybrid coupled to the input signal;
   first and second bandpass filters (BPF's) each having an input terminal, an output terminal, and a pass-band, each BPF configured to pass through signals within its pass-band and to attenuate signals outside of its pass-band, each BPF further configured to reflect signals outside of its pass-band, the input terminal of the first BPF coupled to terminal C of the first quadrature hybrid, the output terminal of the first BPF coupled to terminal C of the second quadrature hybrid, the input terminal of the second BPF coupled to terminal D of the first quadrature hybrid, the output terminal of the second BPF coupled to terminal D of the second quadrature hybrid; and
   a load coupled to terminal A of the second quadrature hybrid.

3. The apparatus of claim 2, the energy harvesting module coupled to terminal B of the first quadrature hybrid.

4. The apparatus of claim 3, the processing module comprising a receive (RX) processing module coupled to terminal B of the second quadrature hybrid, the RX processing module configured to receive power from the energy harvesting module.

5. The apparatus of claim 4, the processing module further comprising a transmit (TX) processing module, the apparatus further comprising a switch configured to selectively couple terminal B of the second quadrature hybrid to either the TX processing module or the RX processing module.

6. The apparatus of claim 5, the TX processing module configured to receive power from the energy harvesting module.

7. The apparatus of claim 4, the processing module further comprising a transmit (TX) processing module, the apparatus further comprising a duplexer configured to couple terminal B of the second quadrature hybrid to both the TX processing module and the RX processing module.

8. The apparatus of claim 7, the load coupled to terminal A of the second quadrature hybrid comprising an input terminal to the energy harvesting module.

9. The apparatus of claim 7, further comprising a detachable module comprising a connector for connecting the detachable module to a wireless communications device, the connector coupled to at least one of the TX processing module or the RX processing module, the input signal to the signal separation module comprising a wireless signal transmitted by the wireless communications device, the wireless signal lying outside the pass-band of the first and second BPF's.

10. The apparatus of claim 9, the detachable module comprising a wireless headset dongle, the connector comprising an audio connector, and the wireless signal comprising a CDMA signal.

11. The apparatus of claim 9, the wireless signal comprising a wireless charging signal.

12. A method for processing an input signal, the method comprising:
   generating quadrature-phase voltage waves from the input signal to separate the input signal into a pass-band signal and a non-pass-band signal;
   storing the energy of the non-pass-band signal in an energy storage element; and
   processing the pass-band signal using the stored energy.

13. The method of claim 12, the generating further comprising:
   coupling the quadrature-phase voltage waves to first terminals of respective band-pass filters; combining the signals at second terminals of the band-pass filters in-phase to generate the pass-band signal; and combining quadrature-phase voltage waves reflected from the band-pass filters in-phase to generate the non-pass-band signal.

14. The method of claim 13, further comprising:
generating TX quadrature-phase voltage waves from a signal to be transmitted; coupling the TX quadrature-phase voltage waves to the second terminals of the band-pass filters; and
combining the signals at the first terminals of the band-pass filters in-phase to generate a TX signal.

15. The method of claim 14, further comprising switching in time between the generating TX quadrature-phase voltage waves from the signal to be transmitted and the generating quadrature-phase voltage waves from the input signal.

16. The method of claim 15, the non-pass-band signal further comprising a portion of the signal to be transmitted reflected from the band-pass filters.

17. The method of claim 14, further comprising:
coupling a wireless signal transmitted by a wireless communications device to the input signal, the wireless signal lying outside a pass-band of the first and second BPF's; and
receiving from the wireless communication device a signal to generate the signal to be transmitted.

18. The method of claim 17, the wireless communications device comprising a mobile phone, the wireless signal comprising a CDMA signal, the signal received from the wireless communication device comprising an audio signal from the mobile phone, the signal to be transmitted comprising an upconverted and processed signal for wireless transmission derived from the audio signal.

19. The method of claim 17, further comprising:
processing the pass-band signal using a receive (RX) processing module;
supplying power to the RX processing module from the energy storage element; and
sending a signal processed by the receive processing module to the wireless communications device.

20. The method of claim 12, the processing the pass-band signal comprising processing the pass-band signal using a receive (RX) processing module, the method further comprising supplying power to the RX processing module from the energy storage element.

21. The method of claim 12, the non-pass-band signal comprising at least one signal transmitted by a transmitter for the purpose of energy harvesting at a receiver.

22. An apparatus for harvesting energy from an input signal, the apparatus comprising:
means for generating quadrature-phase voltage waves from the input signal to separate the input signal into a pass-band signal and a non-pass-band signal;
means for storing the energy of the non-pass-band signal; and
means for processing the pass-band signal using power supplied by the means for storing.

23. The apparatus of claim 22, further comprising:
means for coupling the means for processing the pass-band signal to a wireless device, the input signal comprising a signal transmitted by the wireless device.

24. An apparatus detachably coupleable to a wireless communications device, the apparatus comprising:
a connector for connecting the apparatus to the wireless communications device;
a signal separation module configured to receive an input signal and generate quadrature-phase voltage waves to separate the input signal into a pass-band signal and a non-pass-band signal, the input signal comprising a wireless signal transmitted by the wireless communications device;
a processing module configured to process the pass-band signal, the processing module coupled to the connector; and
an energy harvesting module configured to store the energy of the non-pass-band signal, and to supply power to the processing module.

25. The apparatus of claim 24, the apparatus comprising a wireless headset dongle, the connector comprising an audio connector, and the wireless signal comprising a CDMA signal.

26. The apparatus of claim 24, the signal separation module comprising:
first and second quadrature hybrids each having four terminals A, B, C, D, each quadrature hybrid configured to separate an incoming voltage wave at terminal A into the quadrature-phase voltage waves at terminals C and D, each quadrature hybrid further configured to combine incoming quadrature-phase voltage waves at terminals C and D into an outgoing voltage wave at terminal B, terminal A of the first quadrature hybrid coupled to the input signal;
first and second bandpass filters (BPF's) each having an input terminal, an output terminal, and a pass-band, each BPF configured to pass through signals within its pass-band and to attenuate signals outside of its pass-band, each BPF further configured to reflect signals outside of its pass-band, the input terminal of the first BPF coupled to terminal C of the first quadrature hybrid, the output terminal of the first BPF coupled to terminal C of the second quadrature hybrid, the input terminal of the second BPF coupled to terminal D of the first quadrature hybrid, the output terminal of the second BPF coupled to terminal D of the second quadrature hybrid; and
a load coupled to terminal A of the second quadrature hybrid.

\* \* \* \* \*